United States Patent [19]
Oglivie et al.

[11] 3,918,145
[45] Nov. 11, 1975

[54] AUTOMATIC MACHINE TOOL

[76] Inventors: Frank R. Oglivie, 1205 W. Cypress No. 122; Peter J. Kalman, 615 W. Allen, both of San Dimas, Calif. 91773

[22] Filed: July 8, 1974

[21] Appl. No.: 486,484

[52] U.S. Cl. ................................. 29/564; 29/33 Q
[51] Int. Cl.² ........................................ B23P 23/02
[58] Field of Search .......... 29/563, 564, 33 S, 33 Q, 29/33 R

[56] References Cited
UNITED STATES PATENTS

| | | | |
|---|---|---|---|
| 1,934,990 | 11/1933 | McGrew | 29/33 Q |
| 3,127,661 | 4/1964 | McConnell | 29/33 Q |

*Primary Examiner*—Gil Weidenfeld
*Attorney, Agent, or Firm*—Boniard I. Brown

[57] ABSTRACT

An automatic machine tool and machining method wherein a linear workpiece is periodically advanced endwise along a work feed path and then rotated to selected work positions, selected machining operations are performed on the workpiece in these work positions, and the machined portion of the workpiece is cut off to form a machined part. Provision is made for programming or regulating the machining operations to attain a desired configuration of the machined parts. The invention is described in connection with automatic machining of a linear work member, such as an extrusion, having a longitudinal web-like plate and longitudinal flanges projecting from the plate sides by slotting the plate at intervals to form longitudinally spaced pairs of laterally aligned slots which extend from a laterally intermediate flange of the plate through the longitudinal plate edges, drilling holes through the plate adjacent the ends of each slot pair, and cutting the flange between the aligned slot ends to form machined members each having a plate with flanges including a laterally intermediate flange whose ends extend beyond the plate ends to form tongues for joining the member to other members.

8 Claims, 29 Drawing Figures

AUTOMATIC MACHINE TOOL

BACKGROUND OF THE INVENTION

1. Field of the Invention

This invention relates generally to machine tools and more particularly to an automatic programmable machine tool and machining method for performing selected successive machining operations on a workpiece to produce machined parts of desired configuration.

2. Discussion of the Prior Art

As will appear from the ensuing description, the machine tool and machining method of the invention may be adapted to a variety of workpiece shapes and materials and a variety of machining operations to produce machined parts or members of various configurations for a variety of uses. The invention will be described in connection with machining linear work members to be assembled into frame structures of various types.

Many structures embody linear frame members, such as extrusions, of various channel or channel-like cross-sections which must be notched, drilled and/or otherwise machined and cut-off to predetermined lengths. These machined frame members are joined to other members or parts to form the completed structure. Examples of such structures are shower door frame, sliding door frames, closet door frames, aircraft components and extruded parts of varying cross-section.

In the past, frame members of the character described have often been fabricated with the aid of machine tools which require at least some manual control of the tools and/or manual feeding or positioning of the workpiece from which the finished frame members are machined. This method of fabrication obviously has several disadvantages, the foremost of which are relatively long fabrication time and resultant high fabrication cost, potential safety hazards to the machine operators, possiblity of operator error resulting in improperly machined members, and others.

SUMMARY OF THE INVENTION

This invention provides a programmable machine tool and machining method for performing a series of selected fully automatic successive machining operations on a workpiece to produce accurately formed machined parts or members of desired configuration with minimum machining time and at minimum machining cost. The machining schedule programmed into the machine may be quickly and easily changed to vary the configuration of the machined members.

To this end, the machine tool has a frame with means for supporting a workpiece for movement along a given work feed path and rotation about a given axis. Work positioning means are provided for moving a workpiece to selected positions along the path and rotating the workpiece to selected positions about the axis in such a way as to locate the workpiece in selected successive work positions relative to the frame. Mounted on the frame are machining means for performing selected machining operations on the workpiece in its various work positions. Programmed control means operate the work positioning means and machining means in timed relation to machine the workpiece to the desired configuration. The machining schedule of the programmed control means may be readily changed to vary the machining operations and thereby the final configuration of the machined members.

The particular machine tool described is designed to operate on a relatively long linear workpiece, such as an extrusion, of channel-like cross-section to produce from each workpiece a number of similar machined channel-like frame members with end connecting tongues for joining the members to other members, having a plate extending the full length of the workpiece and longitudinal flanges projecting from opposite sides of the plate, including a flange, referred to herein as a laterally intermeidate flange, located between the longitudinal plate edges. During its automatic operation, the work positioning means of the machine tool periodically advances the workpiece endwise along the work feed path to successively align longitudinal spaced portions of the workpiece with the machining means and following each advance rotates the workpiece about its longitudinal axis to locate the workpiece in selected work positions relative to the machining means. The machining means operate on the workpiece in these work positions to first notch the workpiece plate inwardly from its longitudinal edges to the laterally intermediate flange, thus forming a pair of laterally aligned slots in the plate at opposite sides of the flange, and to notch the remaining plate flanges in alignment with the plate slots, then drill holes through the plate adjacent the ends of its slots, and finally cut through the laterally intermediate flange between the ends of the plate slots. The workpiece is thereby machined and cut off at intervals to form a number of machined parts or members each having a plate with projecting flanges including a laterally intermediate flange whose ends extend beyond the plate ends to provide connecting tongues for joining the members to other members.

The machining means of the described machine tool comprise cutters which are supported for movement in various directions and independently operable actuator means for moving the cutters in these directions. The programmed control means of the machine operate the work positioning means and the actuator means in a predetermined timing and sequence to effect the machine tool operation just described. The programmed control means has provision for changing the programmed schedule of the machine to alter the configuration of the machined members and to adapt the machine tool to various workpiece shapes.

DESCRIPTION OF THE PREFERRED EMBODIMENT

As noted earlier, the invention has two primary aspects. One aspect of the invention is best illustrated in FIGS. 13–18 and involves a method of machining a linear workpiece 10, such as an extrusion, of a particular channel-like cross-section into a number of similar machined parts or members 12 suitable for assembly into structures of the kind mentioned earlier.

The other aspect of the invention is concerned with the machine tool 16 and method of machine tool operation illustrated in FIGS. 1–12 and 19–27 for the particular machining application illustrated in FIGS. 13–18 and for other machining applications.

Referring first to FIGS. 13–18, the workpiece 10 comprises a long and relatively slender member of generally channel-like cross-section and includes a plate 18 and flanges 20, 22, 24, 26 and 28 extending the full length of the workpiece. Flange 20 projects from the underside of the plate 18, as viewed in FIG. 13, between the longitudinal edges of the plate and is referred to herein as the laterally intermediate flange. Flange 22 projects from the underside of the plate along one longitudinal plate edge and has an in-turned lip 30. Flanges 24 and 26 project from the upper side of the plate between the planes of the flanges 20, 22, and flange 28 projects from the upper side of the plate along its opposite longitudinal edge.

Figures 17, 18, 18A:
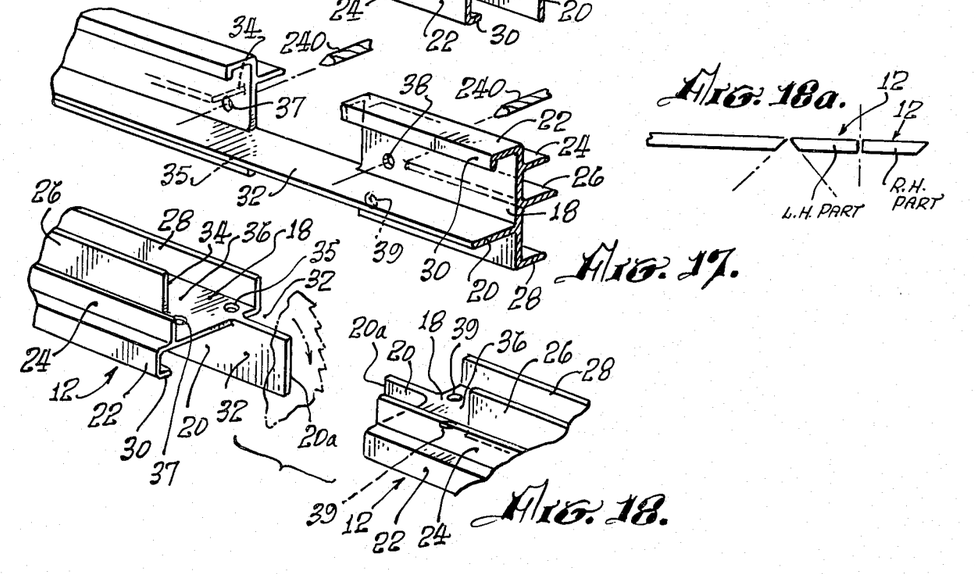
FIG. 18a illustrates an alternative workpiece cut-off sequence which may be programmed into the machine.

FIGS. 14–18 illustrate the present inventive method of machining the workpiece 10 into the separate machined parts or members 12. Generally speaking, this machining method involves initial slotting (FIGS. 14, 15, 16) of the workpiece plate 18 and flanges 22, 24, 26, and 28 at positions spaced along the workpiece to form at each position a pair of slots 32 in the plate 18 and a slot 34 in the flange 26. The plate slots are located at opposite sides of the laterally intermediate flange 20 in alignment laterally of the workpiece and extend from the latter flange laterally outward through the remaining plate flanges and open through the longitudinal plate edges. Flange slot 34 is aligned with the plate slots 32 and extends from the plate 18 through the outer edge of the flange 26. The flange slot 34 is somewhat longer than the plate slots 32 so that flange free spaces 36 are provided between the ends of the plate slots and the ends of the flange slot. After the workpiece has been slotted as described, portions of the flange 22 at opposite sides of the plate slots 32 are removed, as shown at 41 in FIG. 17a. Holes 35, 37, 38, 39 are drilled through the plate 18 within the spaces 36. Finally the workpiece flange 20 is cut between the ends of the plate slots 32, as shown in FIG. 18.

The above described machining operations are repeated at each of the spaced positions along the workpiece 10. It will be now understood, therefore, that the workpiece is machined and cut off at intervals in such a way as to form a number of similar machined parts or members 12. Each machined member has a plate 18 and flanges including a laterally intermediate flange 20 whose ends project beyond the ends of the member plate to form connecting tongues 20a for joining the member to other members.

The machine tool 16 is uniquely constructed and arranged to automatically machine the workpiece 10 in the manner just described and illustrated in FIGS. 13–18. As noted earlier and described in more detail later, however, the machine tool 16 may be adapted and programmed for other machining applications.

Machine tool 16 has a frame 40 with a base 42, an upright supporting column 44, and a horizontal table structure 46. Mounted on the table structure 46 are means 48 for supporting the workpiece 10 for endwise movement along a work feed path P and rotation about an axis which, in the particular machine tool illustrated, coincides with the path P and hence with the longitudinal axis of the workpiece. Work supporting means 48 comprises, in part, a first linear work positioning means 50 for moving the workpiece 10 endwise along the path P to selected successive positions along the path and a second rotary work positioning means 52 for rotating the workpiece about its longitudinal axis to selected angular positions. The work supporting means 48 further comprises a platform 54 affixed to frame 40, as shown at the right in FIG. 2 and in FIGS. 7 and 8 onto which the adjacent end of the workpiece slides as it emerges from the rotary work positioning means 52.

Figure 1:
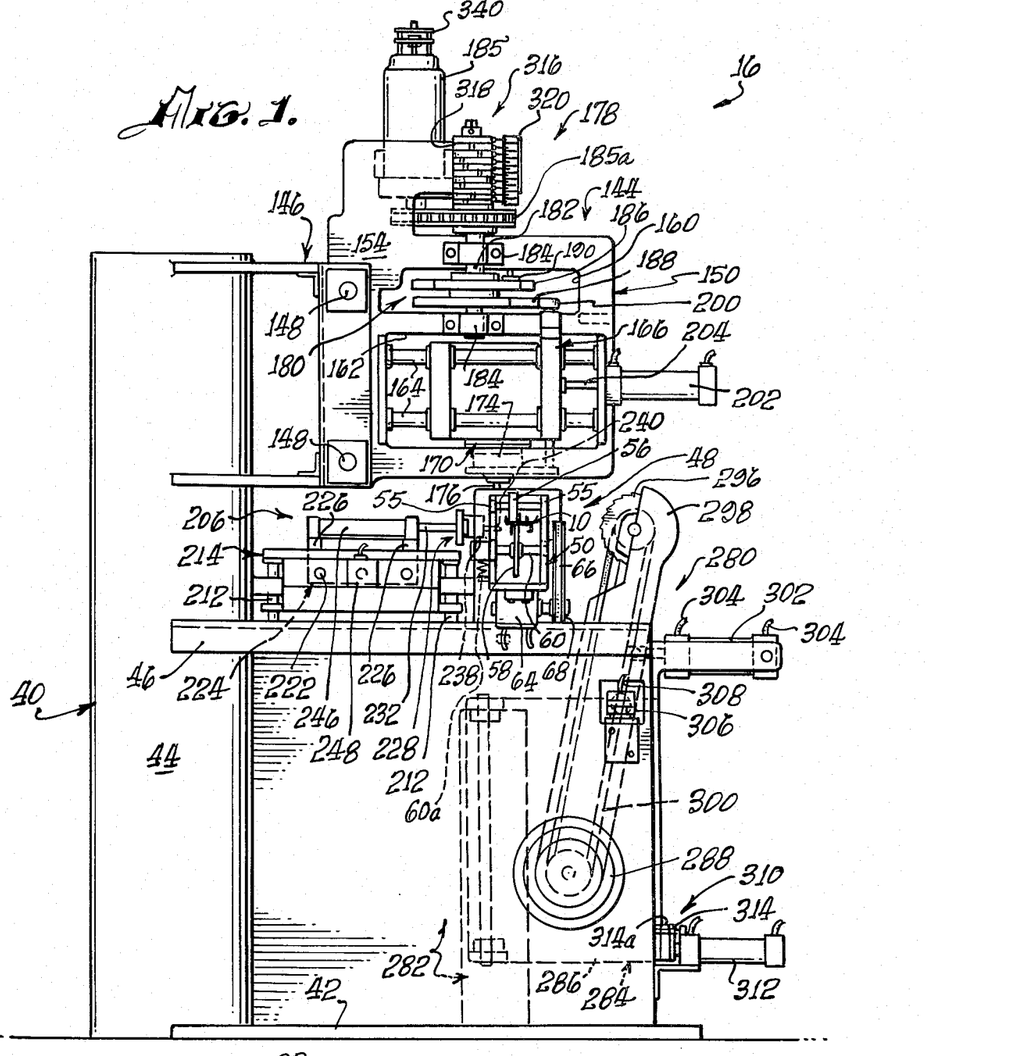
FIG. 1 is a side elevation of a machine tool according to the invention.
Figures 2, 26:
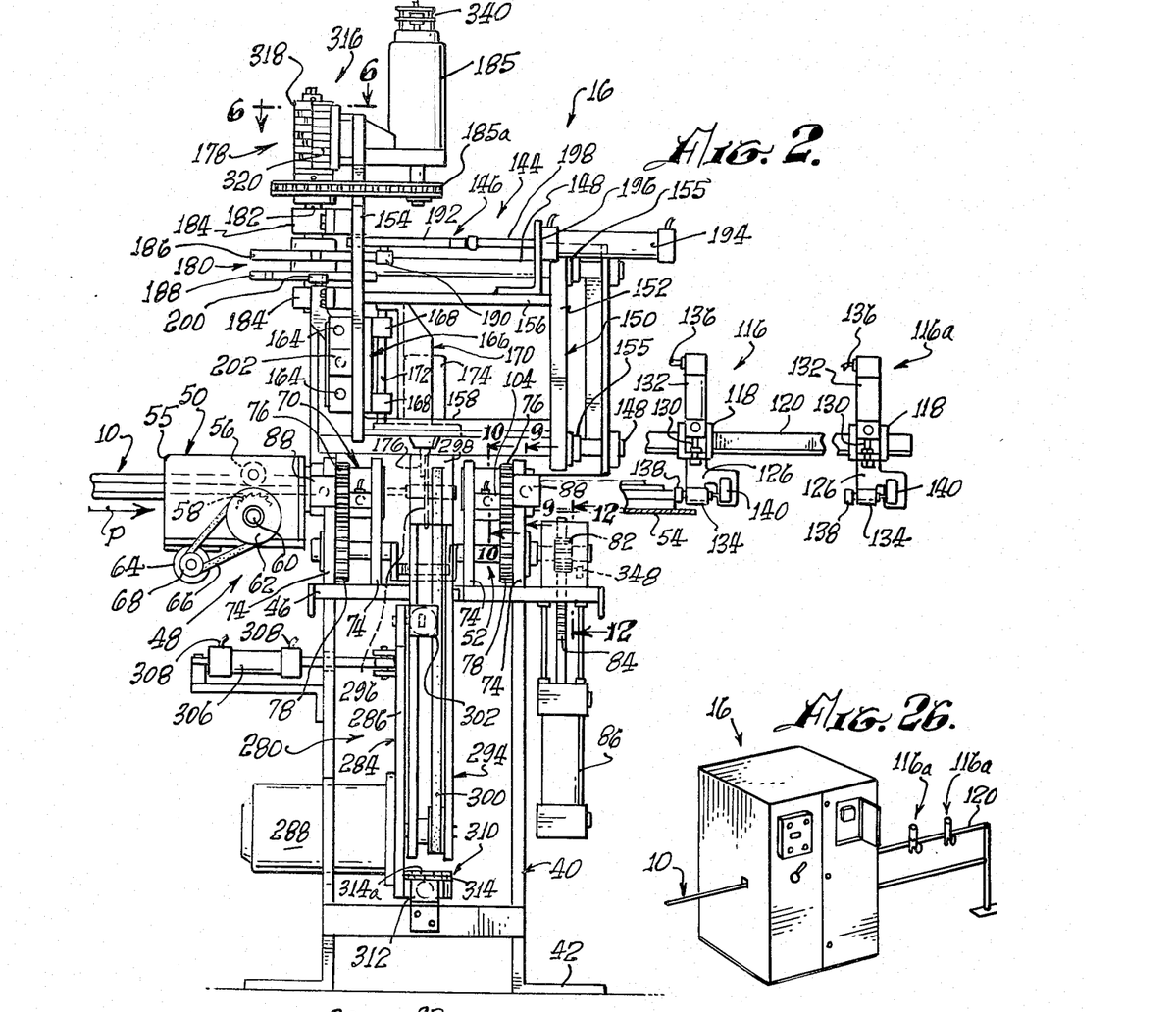
FIG. 2 is a front elevation of the machine tool.
FIG. 26 is a perspective view of the machine housing.

Linear work positioning means 50 comprises an open ended housing 55 which is rotatably mounted, in a manner to be explained shortly, to turn with the workpiece 10 about its longitudinal axis upon rotation of the workpiece by the rotary work positioning means 52. Mounted within the housing are a pair of rotary work feed rolls 56, 58 which are vertically spaced to straddle and frictionally engage the workpiece 10 in the manner shown in FIGS. 1 and 2. Upper feed roll 56 is an idler roller which turns freely in the housing 55 and is stepped to engage the edges of the work piece flanges 24, 26. Lower feed roll 58 is a toothed wheel which engages the work piece plate 18 and is fixed to a shaft 60 mounting a pulley 62 outside the housing. Roll 58 is driven by a pneumatic motor 64 through a belt 66 trained about the pulley 62 and a pulley 68 on the motor shaft. When the motor 64 is pressurized, the lower feed roll 58 is driven to advance the workpiece 10 through the linear work positioning means 50 and the rotary work positioning means 52. Shaft 60 may be urged upwardly by spring 60a, as shown in FIG. 2.

Figure 9:
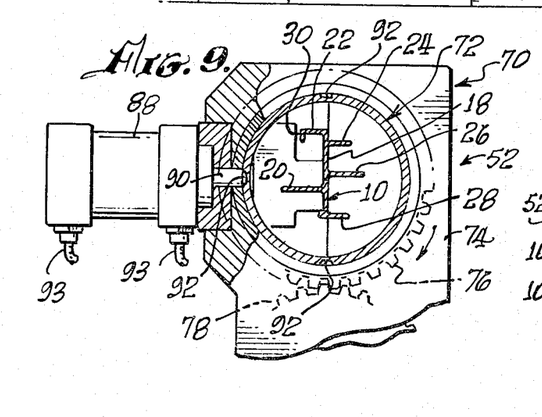
FIG. 9 is an enlarged section taken on line 9—9 in FIG. 2, showing a work holder embodied in the machine tool.
Figure 10:
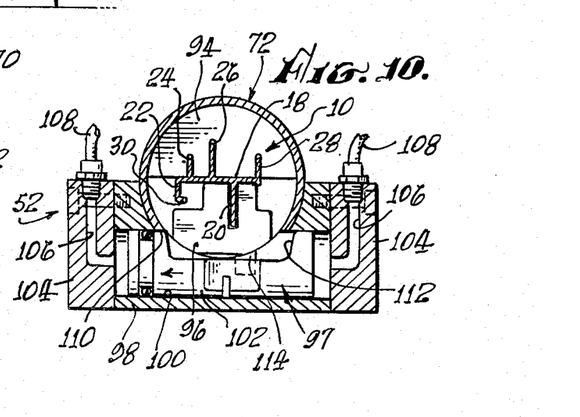
FIG. 10 is an enlarged section through the work holder, taken on line 10—10 in FIG. 2, with the holder rotated 90° from the position of FIG. 9.
Figure 11:
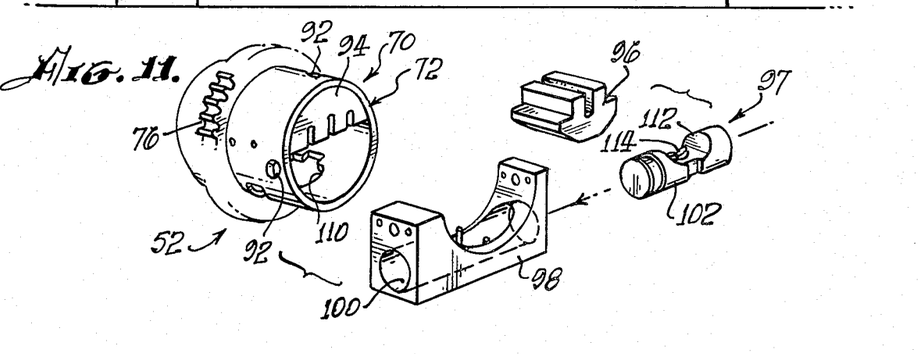
FIG. 11 is an enlarged exploded perspective view of the work holder.
Figure 12:
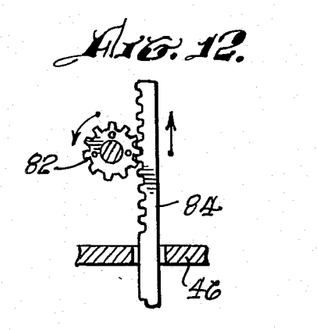
FIG. 12 is an enlarged section taken on line 12—12 in FIG. 2.

Rotary work positioning means 52 comprises a pair of rotary work holding means or collets 70 which are detailed in FIGS. 9–11. Each work holding means or collets 70 comprises a cylindrical work holder 72 journaled within bearing supports 74 on the machine frame table 46 for rotation about an axis coinciding with the work feed path P. The rotation axes of the two collets are aligned, of course. Each work holder 72 is surrounded by a gear 76. The work holder gears 76 mesh with coaxial gears 78 rigid on a crank-like connecting shaft 80 which is journalled in the work holder supports 74 for rotation of the work holders in unison. The right end of the shaft 80 in FIG. 2 mounts a pinion 82 which meshes with a vertically movable rack 84 (FIG. 12). Rack 84 is connected to the plunger of a fluid pressure actuator 86 for movement endwise by the collet actuator. This actuator is operative to rotate the work holders 72 in unison, through the rack and pinion 82, 84, shaft 80, and gears 76, 78.

Each collet work holder 72 is positively indexed in various positions by a fluid pressure indexing actuator 88 (FIG. 9) having an indexing pin 90 which is movable by fluid pressure in the actuator into indexing holes 92 in the respective work holder. Each actuator 88 has fluid lines 93 through which its ends may be selectively pressurized and vented to extend and retract the pin 90 into and from indexing engagement with its respective work holder.

Within each collet work holder 72 is a fixed work guide 94 and a movable work clamp 96 which are shaped to conform generally to the cross-section of the workpiece to be machined. In the case of the workpiece 10, for example, the guide and clamp are slotted to slidably receive the workpiece flanges 20, 24, 26, 28, as shown. Attached to each work holder 72 is a fluid pressure clamp actuator 97 including a semi-circularly recessed block 98 having a cylinder 100 slidably containing a notched piston 102. Bolted to the ends of each cylinder block are end plates 104 having fluid passages 106 communicating the ends of the respective cylinder 100 to fluid lines 108 through which the ends of the cylinder may be selectively pressurized and vented to drive the piston 102 back and forth in the cylinder. As shown best in FIG. 10, each work holder clamp 96 has a tapered bottom which projects through an opening 110 (FIG. 11) in the wall of its respective work holder 72 into the notch or recess 112 in the corresponding piston 102. Fixed within this notch or recess is a cam 114 which is urged against a beveled face of the clamp 96 to urge the clamp against the workpiece 10 upon left-hand movement of the piston in FIG. 10. This action firmly clamps the workpiece to the work holder. Right-hand movement of the clamp piston 102 of each work holder 72 releases the workpiece for endwise movement through the holder. As shown in FIG. 2, the clamp actuators 97 are located between the work holder bearing supports 74 so as to not interfere with rotation of the work holders 72.

It will be now understood that when the work holder clamps 96 are set, the workpiece 10 is firmly gripped in and rotates with the work holders 72 about the work feed path P and the longitudinal axis of the workpiece. As noted earlier, the linear work positioning means 50 is mounted to rotate with the workpiece. To this end, the housing 55 of the work positioning means 50 is connected to the end of the adjacent left-hand rotary work holder 72 so as to rotate with the latter. The feed rolls 56, 58 in the linear work positioning means are aligned with the work guides 94 in the rotary work holders 72 to engage the work piece in the manner shown in FIG. 1.

Considering the operation of the machine tool 16 as described thus far, the work holders 72 initially occupy the position shown in FIG. 10 with their workpiece clamps 96 released. The feed rolls 56, 58 of the linear work positioning means 50 grip the workpiece 10 in a position wherein its flanges 20, 24, 26, 28 are aligned with the slots in the work holder work guides 94 and clamps 96. Accordingly, operation of the motor 64 of the work positioning means 50 drives the workpiece 10 through the work holders 72 onto the work support platform 54 at the right of the machine tool in FIG. 2.

Figure 7:
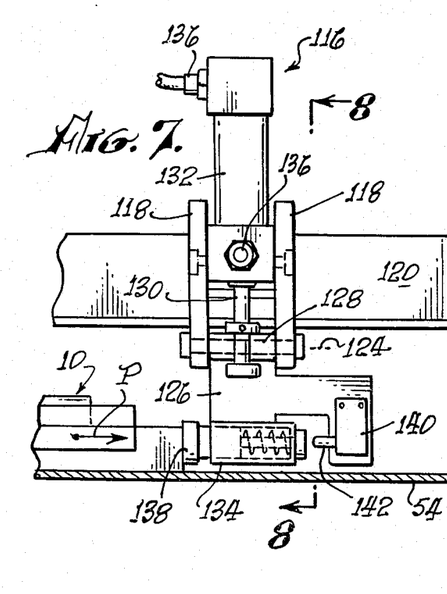
FIG. 7 is an enlarged front elevation of a workpiece stop and ejection means embodied in the tool.
Figure 8:
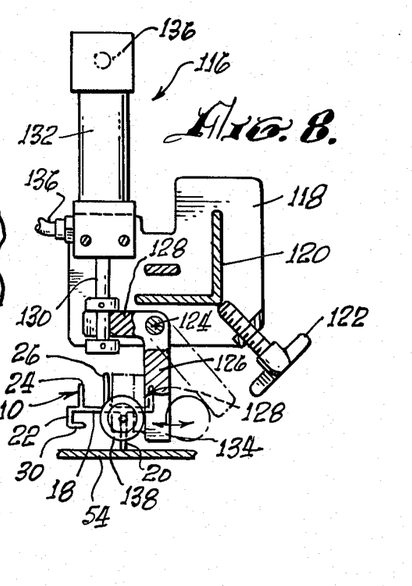
FIG. 8 is a section taken on line 8—8 in FIG. 7.

Mounted over the end of the platform 54 is a combined workpiece stop and ejector assembly 116 and some distance beyond the platform is a second similar assembly 116a. Referring particularly to FIGS. 7 and 8, assembly 116 has a mounting plate 118 which is slotted to slide on an angle bar 120 rigidly fixed at one end to the machine frame 40 extending parallel to the work feed path P. The plate is adjustable along the bar and may be fixed in any position along the bar by a clamp screw 122. Hinged to the plate 118 on a pivot axis 124 parallel to the path P is a bell-crank lever-like member 126. The upper normally horizontal arm 128 of the lever 126 is rockably engaged with the plunger 130 of a fluid pressure actuator 132 mounted on the plate 118, so that movement of the plunger swings the lower lever arm 134 in the direction of the arrows in FIG. 8, laterally into and from the work feed path P. The actuator 132 has fluid lines 136 through which the ends of the actuator may be selectively pressurized and vented to rotate the lever 126.

Mounted on the lower arm 134 of the lever 126 is a spring-loaded plunger 138 movable against spring pressure in the right-hand direction of movement of the workpiece 10 along the work feed path P. Also mounted on the lever arm 134 behind the plunger is a switch 140 whose actuator 142 is depressed by right-hand movement of the plunger 138. During operation of the machine tool 16, the workpiece 10, which is fed along the path P through the rotary work holders 72 and then emerges onto the work support platform 54, as explained earlier, encounters and depresses the work stop plunger 138, thereby stopping and positioning the workpiece endwise and actuating the stop switch 140. As explained later, actuation of this switch stops the endwise advance of the workpiece and initiates the automatic machining cycle of the tool. Stop assembly 116a is identical to stop assembly 116 and serves to stop and locate the workpiece in a second position and initiate an automatic machining cycle, as explained later.

Figures 13, 14, 15, 16:
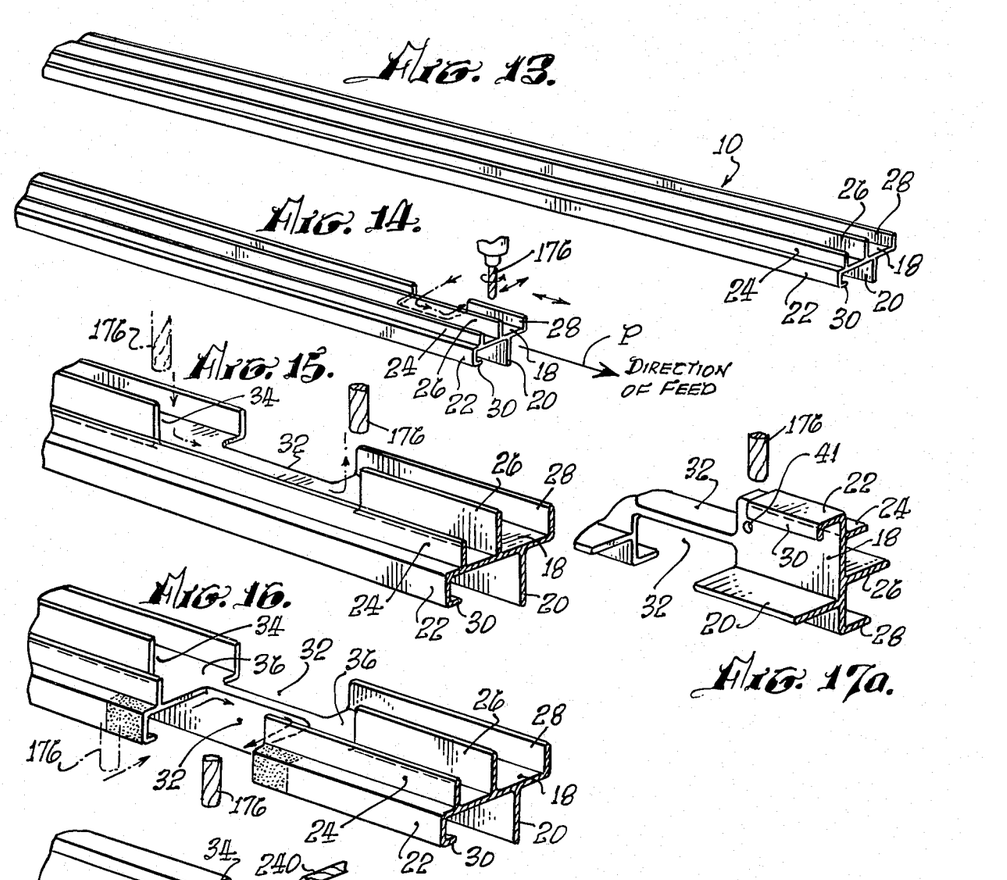
FIGS. 13–18 illustrate the sequential operations of the machine tool.

During the above mentioned automatic machining cycle of the machine tool 16, the latter operates to perform on the workpiece 10 the machining or slotting operations described earlier and illustrated in FIGS. 13–18. The initial workpiece machining or slotting operations illustrated in FIGS. 14–16 are performed by machining means comprising a cutter assembly 144 which will now be described by reference to FIGS. 1, 2, 3, 5 and 6.

Figure 3:
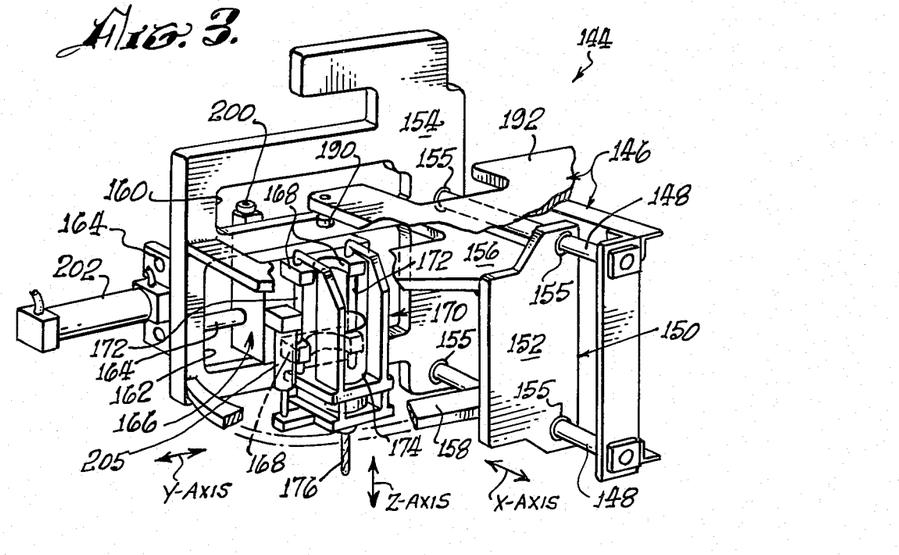
FIG. 3 is an enlarged perspective view of a cutter assembly embodied in the tool.
Figure 4:
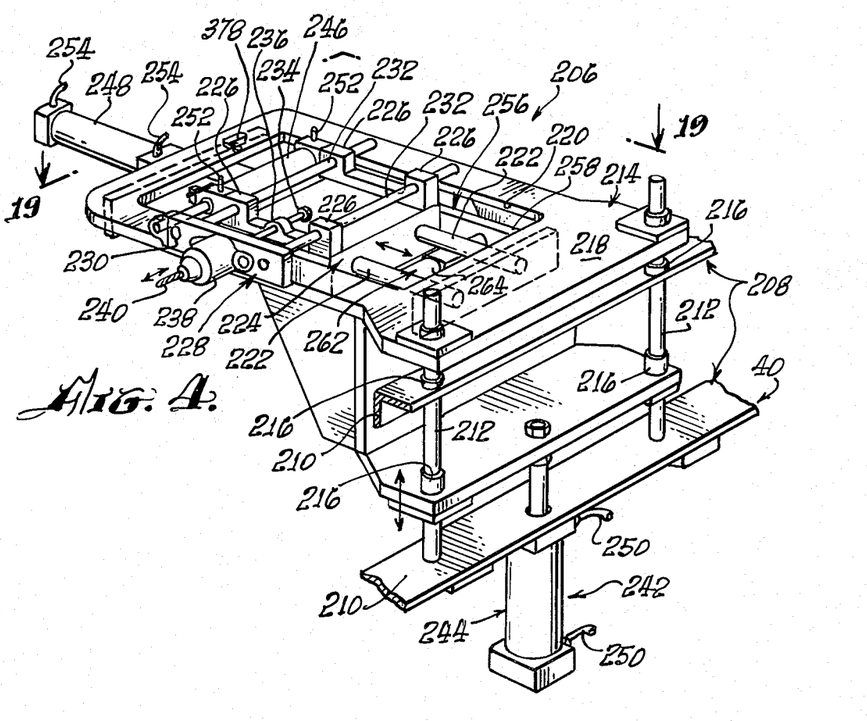
FIG. 4 is an enlarged perspective view of another cutter assembly embodied in the tool.
Figure 5:
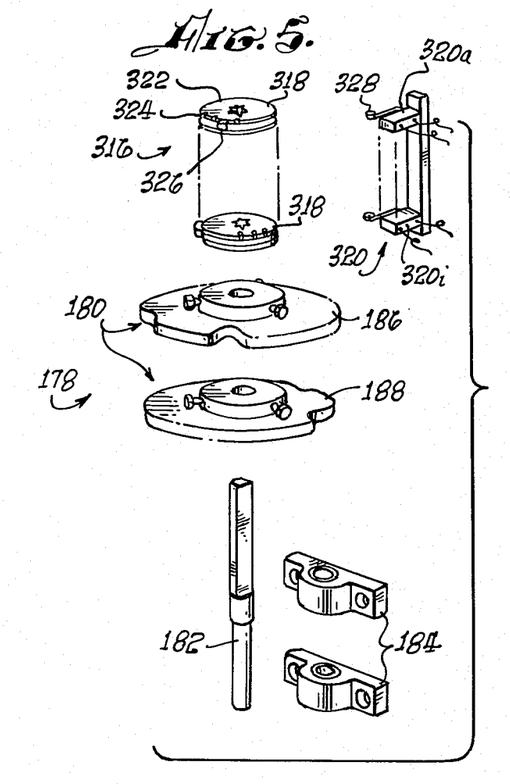
FIG. 5 is an exploded perspective view of a programmable control means embodied on the tool.
Figure 6:
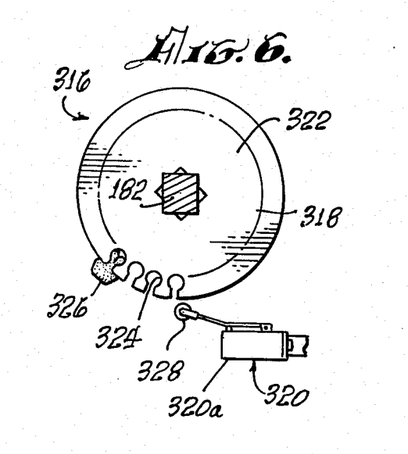
FIG. 6 is an enlarged section taken on line 6—6 in FIG. 2 showing one element of the control means.

Cutter assembly 144, which in this instance is a milling cutter assembly, has a frame 146 firmly attached to the machine tool frame 40. Rigid on the cutter assembly frame 146 are a pair of horizontal slide rails 148 disposed one over the other and extending parallel to the work feed path P. Slidably supported on these rails for movement therealong is a carriage 150. Carriage 150 includes a pair of upright plates 152, 154 perpendicular to the rails 148 and which carry bushings 155 slidably supporting the carriage on the rails and a pair of horizontal plates 156, 158 rigidly joining the upright plates. Carriage plate 154 has a pair of openings 160, 162.

Rigidly fixed to the rear side of the carriage plate 154 in FIG. 3, which is the front side of the plate in FIG. 1, are a pair of horizontal slide rails 164 disposed one over the other and extending across the carriage plate opening 162 normal to the work feed path P and the rails 148. Slidable on the rails 164 is a second carriage 166 including bearing guides 168 which project through the plate opening 162 to the front side of the carriage plate 154 in FIG. 3, which is the right side of the plate in FIG. 2.

The cutter assembly 144 includes a third carriage 170 having vertical slide rails 172 which slide in the bearing guides 168 of the second carriage 166. This third carriage supports a motor 174 which drives a milling cutter 176 having its axis vertical.

From the foregoing description of the cutter assembly 144, it will be understood that the milling cutter 176 is supported for independent movement along three orthogonal axes, hereafter referred to as X, Y, and Z axes, respectively. Thus, movement of the carriage 150 moves the cutter horizontally parallel to the work path P. This cutter movement is hereafter referred to as its X-axis movement and carriage 150 as the X-axis carriage. Movement of carriage 166 relative to carriage 150 moves the cutter horizontally transverse to the path P. This cutter movement is called its Y-axis movement and the carriage 166 is called the Y-axis carriage. Finally, movement of the carriage 170 relative to carriages 150, 166 moves the cutter vertically. This cutter movement is termed its Z-axis movement and the carriage 170 is termed the Z-axis carriage.

Programmable operating means 178 are provided for independently operating as driving the carriages 150, 166, 170 in their respective X-axis, Y-axis and Z-axis directions in timed relation in such a way as to cause the milling cutter 176 to follow a prescribed path of motion relative to the workpiece 10. In the particular machining application illustrated in the drawings, this prescribed motion is made such that the cutter slots the workpiece 10 in the manner described earlier and illustrated in FIGS. 13-16. Programmable means 178 comprises a cam assembly 180 including a vertical shaft 182 carried by the X-axis carriage 150 and rotatably mounted in bearings 184 removably attached to the carriage plate 154. Shaft 182 is driven by a motor 185 mounted on the carriage plate 154 through a sprocket chain drive 185a. Fixed to this shaft are a pair of cams 186, 188 which project through the carriage plate opening 166. Cam 186 engages a follower roller 190 mounted on a fixed plate 192 of the cutter assembly frame 146. A pressurized pneumatic cylinder 194 attached by a bracket 196 to the X-axis carriage 150 has a plunger 198 engaging the frame plate 192 so as to act as a spring for urging the cam 186 against the follower 190. Rotation of the cam 186 thus effects X-axis movement of the X-axis carriage 150, and hence the milling cutter 176 in accordance with the cam profile.

Cam 188 engages a follower roller 200 on the Y-axis carriage 166. A pressurized pneumatic cylinder 202 fixed to the X-axis carriage plate 154 has a plunger 204 engaging the Y-axis carriage 166 so as to act as a spring for urging the follower 200 against the cam 188. Rotation of the cam 188 thus effects Y-axis movement of the Y-axis carriage 166 and thence also the cutter 176 in accordance with the profile of the cam.

Connected between the Z-axis carriage 170 and the Y-axis carriage 166 is a fluid pressure actuator 205 for effecting upward Z-axis movement of the carriage 170 and hence also the cutter 176. Actuator 205 is supplied with working fluid under pressure through valve means controlled by the programmable operating means 178 in the manner explained later to raise the Z-axis carriage 170. The carriage is urged in either direction by fluid pressure. Z-axis movement of the carriage is limited by adjustable stops (not shown).

From the foregoing description, it will be understood that the programmable operating means 178 can be programmed by suitable shaping of its cams 186, 188 and operation of the Z-axis actuator 205, to effect movement of the milling cutter 176 along any desired path of motion relative to the workpiece 10, to make desired cuts in the workpiece. This cutter movement will be discussed presently by reference to FIGS. 13-18. Suffice it to say at this point that the particular machine tool illustrated is conditioned to effect notching or slotting of the workpiece 10 in the manner shown in FIGS. 14-16.

The drilling operation illustrated in FIG. 17 is performed by machining means comprising a cutter or drill assembly 206. This drill assembly will now be described by reference to FIGS. 1, 2, 4 and 19-24.

The drill assembly 206 comprises a frame 208 which is firmly attached to the machine tool frame 40 and includes a pair of horizontal vertically spaced frame bars 210 which extend normal to the work feed path P and parallel to the Y-axis direction mentioned above. Secured to the frame bars 210 are a pair of vertical guide rails 212. The drill assembly has a carriage 214, hereafter referred to as the Z-axis carriage, which is slidably supported on the guide rails 212 by means of bushings 216 for vertical movement. This movement of the carriage is referred to as Z-axis movement.

The Z-axis drill carriage 214 has a horizontal plate portion 218 with a rectangular opening 220. Fixed to the carriage 214 and extending horizontally across this opening, parallel to the work feed path P are a pair of guide rails 222. A second carriage 224, hereafter referred to as the X-axis carriage, is slidably supported on these rails for horizontal movement parallel to the path P. This movement of the X-axis carriage is referred to as X-axis movement.

The X-axis drill carriage 224 has upstanding bearing guides 226 which rise through the Z-axis carriage opening 220 and above the upper side of the carriage plate 218. A third drill carriage 228, hereafter referred to as the Y-axis carriage, has a cross head 230 rigidly secured to the front ends, as viewed in FIG. 4, of a pair of slide rods 232 which slide in the X-axis carriage bearing guides 226. The Y-axis carriage is movable horizontally, normal to the work feed path P. This movement of the Y-axis carriage is referred to as Y-axis movement. Y-axis movement of the Y-axis carriage 228 relative to the X-axis carriage 224 is limited by an adjustable shouldered travel limiting stop 234 extending slidably through a stop shoulder 236 on the latter carriage.

Mounted on the front side of the Y-axis carriage cross head 230 is a motor 238 which drives a drill 240. The axis of this drill parallels the Y-axis of the drill assembly.

From the foregoing description of the drill assembly 206, it will be understood that the drill 240 is supported for independent movement along three orthogonal axes, namely, the horizontal X-axis parallel to the work feed path P, the horizontal Y-axis transverse to the path, and the vertical Z-axis. Z-axis movement of the drill is accomplished by vertical movement of the Z-axis carriage 214. X-axis movement of the drill is accomplished by X-axis movement of the X-axis carriage 224 relative to the Z-axis carriage. Finally, Y-axis movement of the drill, along its rotation axis, is accomplished by Y-axis movement of the Y-axis carriage 228 relative to the X and Z-axis carriages.

The drill assembly 206 includes actuating means 242 for moving the three drill carriages along their respective axes. These actuating means include a fluid pressure actuator 244 connected between the drill assembly frame 208 and the Z-axis drill carriage 214 for effecting Z-axis movement of the carriage, a fluid pressure actuator 246 connected between the Z-axis carriage and the X-axis carriage 224 for effecting Y-axis movement of the latter carriage, and a fluid pressure actuator 248 connected between the Z-axis carriage and the X-axis carriage 228 for effecting X-axis movement of the latter carriage. The three drill carriage actuators 244, 246, 248 have fluid lines 250, 252, 254, respectively, through which the ends of the actuator cylinders are selectively pressurized and vented by operation of electrically operated valves controlled by the programmable operating means 178, as described later, to effect selective X, Y and Z-axis positioning of the drill 240.

It will now be understood that the drill 240 may be selectively moved along the X and Z-axes of the drill assembly 206 to locate the drill in any selected position relative to the workpiece 10 and then advanced along the Y-axis (i.e., the drill axis) to effect drilling of the workpiece at desired locations by proper timed operation of the drill carriage actuators 244, 246, 248. This timed operation of the actuators is accomplished by proper programming of the programmable operating means 178, as explained later. However, accurate positioning of the drill 240 in proper drilling position relative to the workpiece requires positive drill locating or indexing means.

FIGS. 19-24 illustrate indexing or locating means 256 for this purpose. Indexing means 256 comprises an indexing template 258 fixed to the Z-axis drill carriage 214 below the drill carriage plate 218 and to the rear of X-axis drill carriage 224, as the latter is viewed in FIG. 4 (to the right of X-axis carriage in FIG. 19). Template 258 extends parallel to the X-axis of the drill assembly and hence parallel to the work path P and has indexing grooves 260 spaced therealong.

Mounted on the X-axis drill carriage 224 is an indexing mechanism 262 including a fluid pressure indexing actuator 264. Attached to the actuator plunger is an indexing blade 266 which is positioned within a guide 268 at the end of the actuator adjacent the template 258. Blade 266 is free to move toward and away from the template but is restrained against turning about the actuator plunger axis by a pin 270 movable in a slot 272 in the guide 268. Actuator 264 has fluid lines 274 through which the actuator cylinder ends may be selectively pressurized and vented by operation of valve means.

The actuator control valve means are controlled in part by the programmable operating means 178 and in part by switches mounted on the indexing mechanism 262, certain of which have sensing rollers engagable in indexing notches 276, 278, 279 in the template 258, as explained later. Certain of these notches are aligned with indexing grooves 260.

Figures 19, 20, 21, 22, 23, 24, 25:
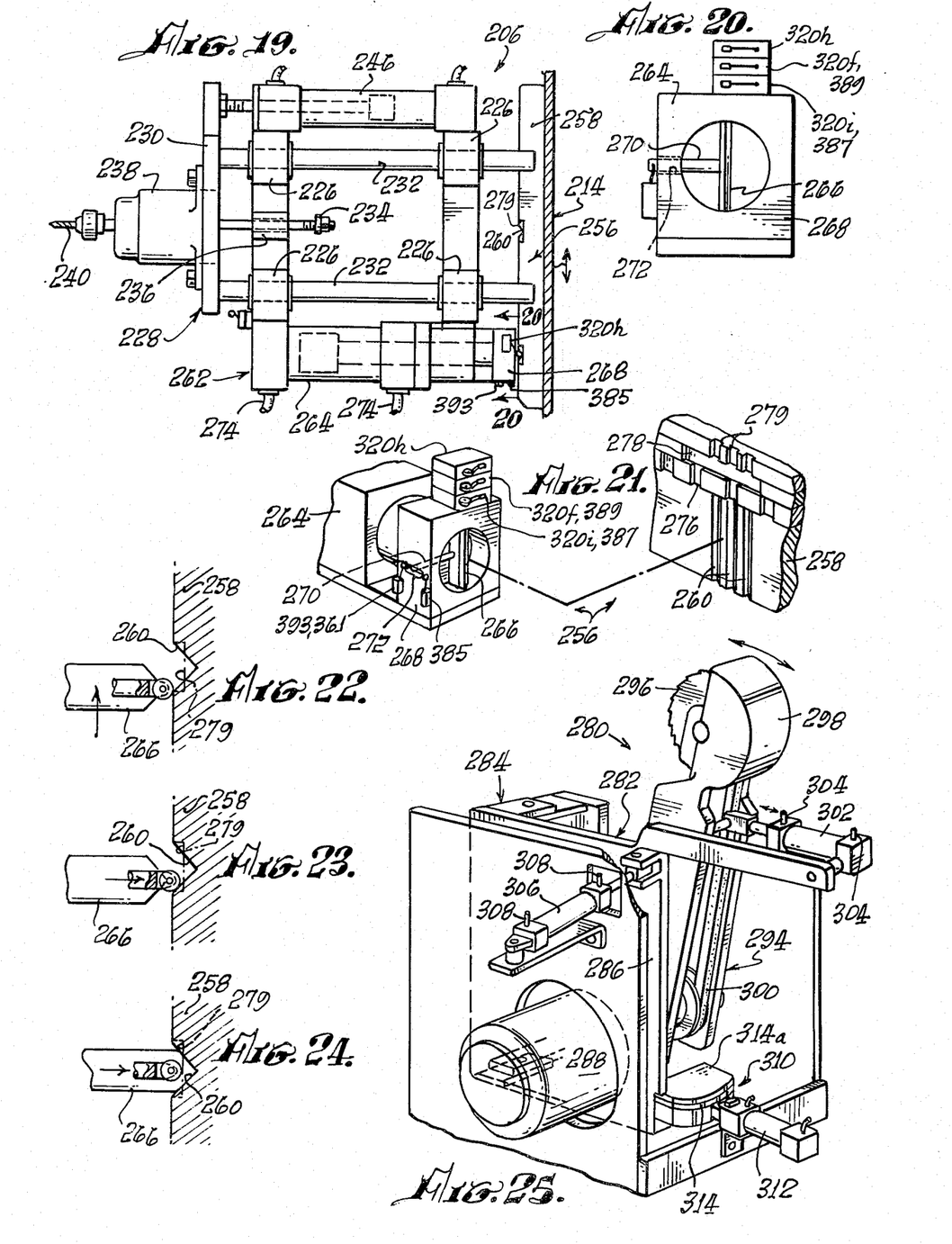
FIG. 19 is a fragmentary view of the cutter assembly in FIG. 4, looking in the direction of the arrows 19—19 in FIG. 4.
FIG. 20 is an enlarged view taken on line 20—20 in FIG. 19, showing a cutter carriage positioning means.
FIG. 21 is a perspective view of certain parts of the positioning means shown in FIGS. 19 and 20.
FIGS. 22–24 illustrate the operation of the cutter carriage positioning means.
FIG. 25 is an enlarged perspective view of a cut-off saw embodied in the machine.

As will be explained in more detail later, in operation of the indexing means 256, when a selected switch sensing roller engages the surface of template 258 between its indexing notches, as in FIG. 22, the switch is retained in a position which effects positioning of the actuator control valve means to deliver pressure fluid to the front end of the indexing blade actuator 262 to retain the indexing blade 266 retracted away from the template, as shown. The X-axis drill carriage actuator 248 then moves the X-axis drill carriage 224 along the X-axis. When the selected switch sensing roller enters an indexing notch in the template 258, the switch is actuated to operate the indexing blade actuator valve means to deliver pressure fluid to the rear end of the blade actuator 264 and thereby force the indexing blade 266 into the corresponding indexing groove 260 to positively index the drill 240 in the X-axis direction. The X-axis movement of the X-axis drill carriage 224 is simultaneously halted as explained later, to permit Y-axis movement of the Y-axis drill carriage 228 to drill a hole in the workpiece. The drill and indexing blade are then retracted and the X-axis drill carriage is advanced to the next drilling position where the action is repeated.

The cut-off operation illustrated in FIG. 18 is performed by machining means comprising a cutter or cut-off saw assembly 280. This cut-off saw assembly will now be described by reference to FIGS. 1, 2 and 25. The saw assembly has a frame 282 fixed to the machine frame base 42. Pivotally mounted on the fixed frame 282, to turn on a vertical axis, is a rotatable saw support 284 including a vertical plate 286. A saw drive motor 288 is fixed to the plate 286 and projects through an enlarged clearance hole in machine frame 40. An arm 294 is journaled at its lower end on the motor shaft to swing on the axis of the shaft. Rotatably mounted on the upper end of the arm is a saw disc 296 partially enclosed by a shield 298 fixed to the arm. The saw disc 296 is driven in rotation by the motor through a belt 300 trained about pulleys on the motor and saw disc shafts and disposed within the arm slot.

Connected between the saw support frame 284 and the upper end of the saw arm 294 is a fluid pressure actuator 302. This actuator has fluid lines 304 through which the ends of the actuator cylinder may be selectively pressurized to swing the saw arm toward and away from the workpiece 10. As explained later, fluid flow to the saw arm actuator 302 occurs through valve means controlled by the programmable operating means 178. Means 178 is programmed to effect operation of the cut-off saw assembly 280 at the proper time to sever the workpiece 10 in the manner shown in FIG. 18.

In the particular cut-off operation illustrated, the saw blade 296 is disposed in a plane normal to the work feed path P and hence normal to the longitudinal axis of the workpiece 10. In other applications of the machine tool 16, however, it may be desirable to cut off the workpiece in a plane oblique to its longitudinal axis as shown in FIG. 18a. To this end, the saw support 284 is rotatably mounted to turn on a vertical axis, as explained above. Connected between fixed machine frame 40 and the rotatable saw support 284 is a fluid pressure actuator 306 (FIG. 25) having fluid lines 308 through which the ends of the actuator cylinder may be selectively pressurized and vented by selective actuation of valve means in the lines controlled by the programmable operating means 178, as explained later. Suffice it to say at this point that the saw support actuator 306 is operated during the workpiece cut-off phase of the machine tool 16 to scan or rotate the saw support 284, and hence the plane of the saw blade 296, through a given angle, say 45°, to either side of a plane normal to the work feed path P. The saw assembly 280 is equipped with an indexing means 310 including an indexing mechanism 312, like the indexing mechanism 262, mounted on machine frame 40 which cooperates with a template 314 on the base of the rotatable saw support 284 to index the saw support to the desired cut-off angle. The operation of the indexing means 310 will be explained presently. Suffice it to say here that in the particular machining application illustrated, the indexing means operates to locate the saw blade 296 in a cut-off plane normal to the work feed path P and hence normal to the longitudinal axis of the workpiece 10.

From the description to this point, it will be understood that the machine tool 16 has several fluid pressure actuators 86, 88, 97, 132, 195, 202, 205, 248, 264, 302, 306 and 312 and several motors 64, 174, 185, 238, and 288 which must operate in timed relation with one another and with rotation of the milling cutter carriage cams 186, 188 to achieve a predetermined automatic operating sequence of the machine, such as that necessary to accomplish the machining operation illustrated in FIGS. 13–18. To this end, the actuators and motors listed above are controlled by a cam switch assembly 316 embodied in the programmable control means 178. Referring particularly to FIGS. 1, 2, 5 and 6, the cam switch assembly 316 comprises a plurality of switch operating cams 318 mounted one over the other on the programmer shaft 182, above the milling assembly drive cams 186, 188. It will be recalled from the earlier description that the programmer shaft 182 is rotatably mounted in bearing 184 removably fixed to the plate 154 of the X-axis milling carriage 150. Mounted on the carriage plate 154 opposite the cams 318, respectively, are switches 320. These switches are designated individually 320a, 320b, etc. for reference in the latter description of the circuit diagram of FIG. 27. Each cam 318 comprises a disc 322 with keyhole slots 324 spaced about its edge for selectively receiving a switch actuating button 326. During rotation of each cam, its button engages and depresses the actuator 328 of its respective switch 320 to actuate the switch from one position to the other. The switches 320 may be either normally open or normally closed as required by the function of each.

Figure 27:
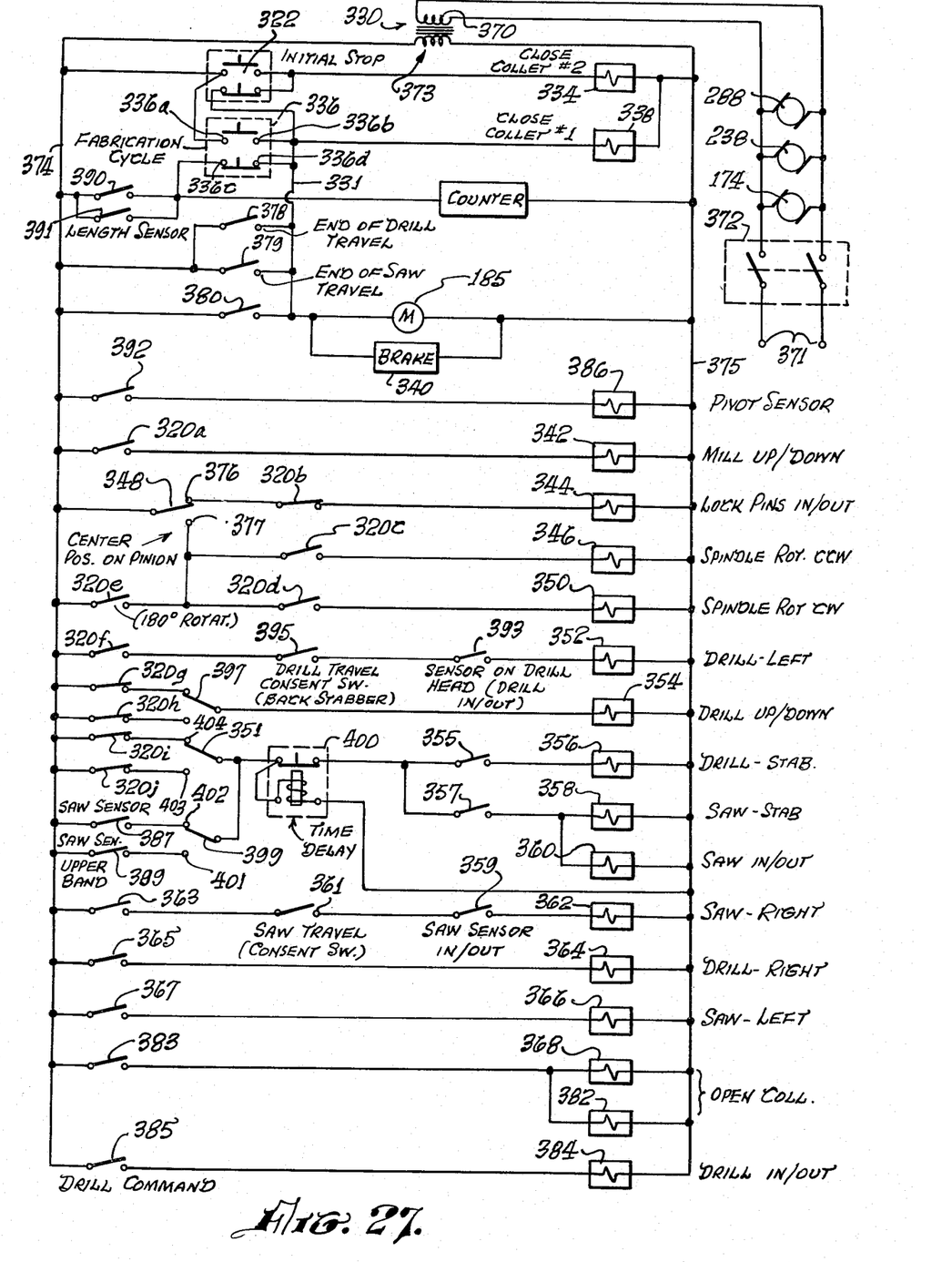
FIG. 27 is an electrical circuit diagram of the machine.

The operation of the machine tool is explained herein below with reference to FIG. 27. Electrical power is provided to the machine tool system via a step-down transformer 300 which has a primary 370 normally connected to a source of a-c line power 371 via an on-off power switch 372; and a low voltage secondary 373 which is connected to low voltage a-c feed lines 374 and 375. When switch 372 is closed, low voltage a-c power is applied via transformer 330 to lines 374, 375. At the same time the milling cutter motor 174, the drill motor 238, and the saw motor 288 are energized from the a-c power line.

An initial stop switch 322 is a push-button switch which when closed energized solenoid valve 334 to supply pressure fluid to the right-hand end (as viewed in FIG. 10) of the clamp cylinder 97 to operate collet 70 in FIG. 2. The collet clamp piston 102 is thereby driven in a direction to urge the collet clamp member 96 upwardly against the fixed collet guide 94 thus closing collet 70.

At this point a workpiece or extrusion 10 is inserted between the feed rolls 56, 58 of the linear work positioning means 50 and its motor 64, which is a pneumatic motor, is pressurized to drive the extrusion endwise through the currently open left-hand collet 70 in FIG. 2 until the extrusion is topped by the closed right-hand collet. The motor 64 then simply stalls so that any time both collets are opened simultaneously, the extrusion is automatically fed endwise through the collets.

After the extrusion is stopped by the closed right hand collet, fabrication cycle switch 336 (a momentary pushbutton switch) is closed. Closure of switch 336 energizes a solenoid valve 338 which supplies pressure air to the clamp cylinder 97 to the left hand collet 70 in FIG. 2, thereby clamping the extrusion firmly in the collet. Closure of the fabrication cycle switch 336 also energizes the programmer motor 185, via live 331 and a brake 340 embodied in motor 185, thereby releasing the brake and driving the programmer cam shaft 182. Rotation of this shaft rotates the milling assembly cams 186, 188 to drive the milling carriages 150, 160 in X-axis and Y-axis motions. The cam switch 320a for the Z-axis milling carriage actuator 204 is actuated by the corresponding programmer cam switch button 306 to operate the solenoid valve 342 for the actuator 204 to cause Z-axis (up-down) movement of the X-axis and Y-axis movements of the milling cutter 176 and thereby cause movement of the milling cutter along a predetermined path relative to the extrusion 10. The extrusion is rotatably positioned about its longitudinal axis, by rotation of the collets 70, as described below, in timed relation to the movement of the milling cutter in such a way as to effect milling of the extrusion to a preselected configuration, such as that shown in FIGS. 14–17a.

During the above rotation of the programmer shaft 182, a switch 320b, which is normally closed, is opened by its programming cam button 326, thereby de-actuating a solenoid valve 344 for the collet lock pin actuators 88 to pressure the latter in a direction to retract the pins 90 from the indexing work holders 72 and thereby release the latter for rotation. Continued rotation of the programmer shaft 182 then effects actuation of a programmer switch 320c from the normally open position to its closed position, thereby energizing a solenoid valve 346 which pressurizes the collet actuating cylinder 86 in a direction to rotate the collet work holders 72, and the extrusion 10 currently clamped in the collets, 90° counter-clockwise from the position of FIG. 16 to the position of FIG. 17. During this rotation of the collets, the continued rotation of the programmer shaft 182 will result in movement of the programmer cam button 326 for switch 320b out of contact with the latter, thereby returning the switch to its normally closed position. The indexing pins 90, however, remain retracted until the collet work holders have rotated 90° and indexing holes 92 in the holders become aligned with the indexing pins. The pins then enter these holes to lock the work holders in position, as described below. In the course of this collet rotation, a switch 348 is actuated from its normally closed terminal 376 wherein it provides a circuit through switches 320b and valves 346 and 350 to its normally open terminal 377 to provide a circuit through switch 320c and the actuator valve 346 and thereby continue the collet rotation until the 90° position of FIG. 17 is reached. Referring to FIG. 2, it will be seen that switch 348 is mounted on the horizontal table structure 46 opposite the collet actuator rack pinion 82. The switch actuator rides on the side face of the pinion and this pinion face is recessed in a way which allows the switch to assure its normally closed position of FIG. 27 when the collets 70 are in their positions corresponding to the extrusion positions of FIGS. 16, 17 and 17a and retains the switch 348 in its normally open position (to terminal 377), wherein it completes a circuit through switch 320c and valve 346, in between the latter collet positions. Switch 320 opens only momentarily, and must return to its normally closed position before switch 348 returns to its normally closed position. Thus, the collet indexing pins 90 remain retracted until the collet work holders 72 are rotated to their 90° position of FIG. 17, whereupon the switch 348 returns to its normally closed terminal 376 to reactuate the solenoid valve 344 for extending the pins into locking engagement with the work holders. Simultaneously, switch 320c is released by its programmer button 326 to deenergize the collet actuator valve 346 and cut off the air supply to the collet actuator cylinder 86.

The above described operations are timed to occur in such a way that the extrusion 10 is first milled as shown in FIGS. 14–16. The extrusion is then rotated from its position of FIGS. 14–16 to its 90° position of FIG. 17 where the drilling operation of the latter figure is performed as hereinafter described.

For the drilling operation of the machine tool, program button 326 actuates switch 380 which deenergizes program motor 185 and energizes brake 340. At the same time two other program buttons actuate switch 355 to connect the drill circuit to the time delay relay 400, and switch 320f to energize solenoid 352, allowing X-axis drill cylinder 248 (FIG. 4) to move the X-axis drill carriage 224 left from its home position. As carriage 224 travels the sensor switches 320g through 320i fall into detents in the program cams corresponding to desired hole drilling locations. As the roller of switch 320i rolls into an appropriate detent position on plate 258 the circuit to solenoid 356 is closed through a time delay relay 400 which holds this circuit closed for a pre-set or selected time duration. Energizing of solenoid 356 extends lock blade 266 (FIGS. 22, 23 and 24) through the action of cylinder 264 (FIG. 19) to locate the drill carriage 224 at the position desired for hole 38. When blade 266 extends into the V-slot 260, pin 270 (FIG. 21) attached to lock blade 266 moves off of switch 393 deenergizing solenoid 352 which prevents further leftward motion of the drill carriage 224 by depressurizing cylinder 248. Switch 385 is actuated to energize solenoid 384 to extend drill feed cylinder 246 to drill hole 38 (FIG. 17).

As the time cycle of time delay 400 runs out, the circuit to solenoid 356 is opened to withdraw lock blade 266 and deactuate switch 385 which deenergizes solenoid 384 to pull the drill out. Pin 270 (FIG. 21), as it returns with lock blade 266, closes switch 393. When the drill returns to its fully retracted position switch 395 (FIG. 19) is actuated to close the circuit to solenoid 352 to permit the X-drill carriage 224 to continue its travel left until the roller of switch 320g rolls into a next detent on the Z-axis sensor band 278 (FIG. 21a) actuating solenoid 354 to extend the Z-axis drill cylinder 244. This moves the drill up into position to drill holes 39 and 35 (FIG. 17). Continuing the leftward movement of the drill carriage 224 switch 320j falls into the next two detents 279 and operates through the same drill in/out sequence described above in connection with the drilling of holes 39 and 35. Switch 320i falling into detents will have no effect since switch 351 moves from terminal 404 to terminal 403. As the left movement continues switch 320g rides out of its continuous detent and actuates solenoid 354 to lower Z-axis drill carriage by cylinder 244 down to the level of lower holes 37 and 38 where further movement of the drill carriage left aligns the drill with hole 37, which is drilled as above described. When hole 37 has been drilled the continued left movement will retract the stroke of cylinder 248 actuating switch 378 to deenergize brake 340 and energize program motor 185.

As the rotation of cam assembly continues switch 320f and switch 355 ride off of their program buttons and deactuate solenoid 352 (drill carriage left movement) and disables the circuit of solenoid 356 to prevent further operation of the drill in/out cycle as the carriage returns to the right.

As the rotation of the cam assembly continues switch 365 is actuated to energize solenoid 364 to cause cylinder 248 to extend returning the drill carriage 224 to "home" at extreme right.

The 180° clockwise rotation of the spindle is initiated when the program cam shaft assembly actuates switch 320b (normally closed) to its open position and closes switches 320e and 320d. Solenoid 344 is deactuated to pull out index pins 90 from index hole 92. At this time switches 320e and 320d energize solenoid 350 causing rock cylinder 86 to withdraw collet work holders 72 and the extrusion 10 through a previously described path 180° clockwise. The program button on the program cam shaft assembly will allow switch 320b to return to its closed position as the spindle rotation goes past 90° resulting in the return of index pin 90 when switch 348 on the pinion rolls into detent indicating the desired spindle position. At the same time switches 320e and 320d roll off their detent positions deenergizing solenoid 350 removing air from rock cylinder 86.

As the program cam assembly 178, 182 continue rotation switch 320a is actuated to operate solenoid 342 which causes the mill head and Z-axis carriage to move down to a new cutting position. Further rotation moves material according to cam requirements at which point switch 320a is released to deenergize solenoid 342 returning the mill head to its down position.

Counter-clockwise rotation of the spindle through 90° was described at an earlier portion of this specification.

The saw operating cycle is effected upon further rotation of the program cam assembly 178, 182 when switches 361, 359, 363, and 357 are closed and switch 380 is open to terminate the rotation of program motor 185.

Solenoid 362 is energized when switches 359, 361 and 363 are closed as a result of which the saw assembly moves from left to right. When switch 387 is actuated by its roller entering detent on sensor band 314 (FIG. 25) it is closed through time delay relay 400 to actuate solenoids 358 and 360. Solenoid 358 causes the extension of the lock blade and positively locate the saw assembly for cutting the workpiece (position of FIG. 18a). As the lock blade extends, switch 359 is deactuated to deenergize solenoid 362 terminating movement of the saw to the right. Solenoid 360 operates cylinder 302 to expand and part the extrusion. When the preset time expires on time delay relay 400 it opens to deenergize both solenoids 358 and 360 thus returning the lock blade and saw to their "out" positions at which switch 361 and 359 are actuated resuming the "arc" travel of the saw assembly from left to right in search of the next detent on sensor band 314. There being no other detent the saw assembly travels the limit of its traverse (cylinder stroke) to actuate switch 379 deenergizing brake 340 and restarting the program motor 185 and the program shaft assembly 178, 182. As rotation occurs switches 357 and 363 roll out of their detents and the saw circuit is disabled and solenoid 362 deenergized. Switch 367 is operated next by an actuation button on shaft 182 and solenoid 366 is energized to return the saw to its extreme left or "home" position.

As a result of further rotation of the program shaft assembly switch 392 is actuated to energize solenoid 386, extending cylinder 132 (FIG. 8). Sensor stop is pivoted out of the path of the extrusion. Plunger 138 is pushed forward so that when switch 392 is opened as it rolls off its actuation button, solenoid 386 is deenergized, returning the sensor pivot back to where the plunger rests against the side of the extrusion, so that it passes freely through when the collets open and feed operation is resumed. Thereafter the sensor stop pivots back to its home position.

As the sawing operation is completed the cam shaft is rotated allowing switch 383 to momentarily actuate the open again to provide a pulse which energizes solenoids 368 and 382 opening the collets by shifting spools 102 (FIG. 11) unclamping the extrusion. The extrusion is propelled forward by the air motor 164. The continued rotation of the program assembly actuates switch 380 to terminate programmer motor operation. Finally the extrusion is stopped by the bottoming out of the plunger against weldment frame 126, thus stalling air motor 64. Plunger 138 actuates switch 140 to start the program motor again for further fabrication programming.

Switch 351 is actuated on further rotation of the program assembly to set the machine up for further hole drilling operations through time delay relay 400, switches 355, 380 and 320f with solenoid 352 operating drill carriage 224 in the left direction. When the hole drilling is completed as previously described drill carriage 224 is moved to the extreme right limit of the cylinder stroke and starting further programmer rotation actuates switch 365 to return the drill carriage right and home. Switches 355 and 351 are deactuated and at the same time switch 392 is actuated to pivot the sensors out of the way so the extrusion can feed through.

Again further rotation of the program assembly results in the pulse action of switch 383 to open the collets as described before, whereupon the air motor feeds the extrusion against sensor stop No. 2 to put the extrusion in the cycle for further saw operations using sensor 314a, the time delay relay 400 and switches 363, 399, 353 and finally 380 to stop the program motor again while switch 389 controls saw operation No. 1. As previously described the cycle will continue through saw position No. 3 as shown in FIG. 21b. cutting at different angles. The saw returns to its home position and finally the finished part is ejected and deposited in a bin near the machine.

There has been described hereinabove an automatic machine tool for cutting and drilling complexly shaped elongated extrusions by programming the operations of a saw and a drill and positioning them in accordance with a sequence of operations under the control of detented cams. Various switches with roller actuators are used to enter and fall out of the detents to electrically control the functions.

The inventors claim:
1. A machine tool comprising:
a frame,
means on said frame for supporting a workpiece for movement along a given path and rotation about a given axis,
machining means on said frame along said path for performing selected machining operations on the workpiece,
first work positioning means for intermittently feeding the workpiece to successive positions along said path,
second work positioning means for intermittently rotating the workpiece to successive positions about said axis,
said work positioning means being operable in timed relation to locate the workpiece in selected successive work positions relative to said machining means,
means for operating said work positioning means and machining means in timed relation to locate the workpiece in said work positions in sequence and in each work position to perform one of said machining operations on the workpiece,
said machining means comprising a plurality of rotary cutters including a milling cutter, a drill, and a cutoff saw, operable on the workpiece sequentially in its work positions, respectively, means for driving said cutters in rotation, and means supporting said cutters for movement along prescribed paths into and from cutting engagement with the workpiece, and
said operating means comprises means for moving each cutter along its prescribed path upon movement of the workpiece to the work positions, in which the respective cutter is operable on the workpiece.

2. A machine tool according to claim 1 wherein:
said operating means comprises means for adjusting said prescribed paths of said cutters.

3. A machine tool comprising:
a frame,
means on said frame for supporting a workpiece for movement along a given path and rotation about a given axis,
machining means on said frame along said path for performing selected machining operations on the workpiece,
first work positioning means for intermittently feeding the workpiece to successive positions along said path,
second work positioning means for intermittently rotating the workpiece to successive positions about said axis,
said work positioning means being operable in timed relation to locate the workpiece in selected successive work positions relative to said machining means,
means for operating said working positioning means and machining means in timed relation to locate the workpiece in said work positions in sequence and in each work position to perform one of said machining operations on the workpiece, said path is a linear path,
said axis coincides with said path,
said workpiece is a linear workpiece such as an extrusion,
said work supporting means supports the workpiece for endwise movement along said path and rotation about the longitudinal axis of the workpiece, and,
said machining means comprises a plurality of rotary cutters including a milling cutter, a drill, and a cutoff saw, operable on the workpiece sequentially in its work positions, respectively, means for driving said cutters in rotation, and means for sequentially moving said cutters along prescribed paths into and from cutting engagement with the workpiece upon movement of the workpiece to the respective work positions.

4. A machine tool comprising:
a frame,
means on said frame for supporting a workpiece for movement along a given path and rotation about a given axis,
machining means on said frame along said path for performing selected machining operations on the workpiece,
first work positioning means for intermittently feeding the workpiece to successive positions along said path,
second work positioning means for intermittently rotating the workpiece to successive positions about said axis,
said work positioning means being operable in timed relation to locate the workpiece in selected successive work positions relative to said machining means,
means for operating said work positioning means and machining means in timed relation to locate the workpiece in said work positions in sequence and in each work position to perform one of said machining operations on the workpiece,
said path is a linear path,
said rotation axis coincides with said path,
said workpiece is a linear workpiece, such as an extrusion,
said work supporting means comprises a rotary work holder for supporting the workpiece for endwise movement along said path and rotation about the longitudinal axis of the workpiece,
said first work positioning means includes means for intermittently feeding the workpiece endwise a given distance along said path and through said work holder,
said second work positioning means including means for clamping the workpiece to said work holder and means for driving the work holder in rotation,
said operating means includes means for operating said clamping means and driving means in timed relation to the operation of said first work positioning means and said machining means, and
said machining means comprise three rotary cutters comprising, respectively, a milling cutter, a drill, and a cut off saw, operable in selected work positions of said workpiece, means for driving each cutter in rotation, and means for moving each cutter along a prescribed path into and from cutting engagement with said workpiece upon movement of the workpiece to each work position in which the respective cutter is operable.

5. A machine tool according to claim 4 wherein:
said cutter moving means comprises means supporting said milling cutter for movement in three mutually orthogonal directions including a first transverse direction of said linear path parallel to the milling cutter rotation axis, a second transverse direction of said linear path, and a third direction along said linear path, three independently operable means for effecting movement of said milling cutter in said orthogonal directions, respectively, and means for selectively operating said three independently operable means in preselected timed relation, means supporting said drill for movement in three mutually orthogonal directions including a first transverse direction of said linear path parallel to the drill rotation axis, a second direction transverse to said linear path, and a third direction along said linear path, three independently operable means for effecting movement of said drill in said latter orthogonal directions, respectively, and means for selectively operating said latter three independently operable means in preselected timed relations, and means supporting said saw for edgewise movement across said linear path, actuator means for moving said saw edgewise, actuator means for adjusting the angle between the plane of the saw and said linear path, and means for selectively operating said actuator means in preselected timed relation.

6. A machine tool according to claim 5 including:
means for altering said prescribed cutter paths.

7. A machine tool comprising:
a frame,
means on said frame for supporting a linear workpiece such as an extrusion having a plate and flange extending the full length of the workpiece with the flange projecting from one side of the plate between its longitudinal edges,
means on said frame for automatically slotting said plate to form in the plate a pair of slots located at opposite sides of said flange in alignment laterally of said workpiece and extending from said flange through the longitudinal edges of said plate,
means on said frame for thereafter cutting said flange between the end edges of said slots to sever said workpiece into separate members each having a plate and a flange projecting beyond an end of the member plate to form a tongue for joining the member to another member.
means for periodically advancing said workpiece endwise past said slotting and cutting means, and means for automatically operating said advancing means, slotting means and cutting means in timed relation to slot and sever said workpiece at intervals along the workpiece.

8. A machine tool according to claim 7 wherein:
said workpiece has an additional longitudinal flange projecting from the opposite side of said workpiece plate,
said slotting means is operable to slot said additional flange to form in the latter flange a slot aligned with and extending longitudinally beyond said end edges of said slot pair and extending from said opposite plate side through the longitudinal edge of the additional flange, and
said tool includes means operable between the operations of said slotting and cutting means for drilling holes through said plate in the regions between the ends of said slot pair and additional flange slot.

* * * * *